(12) United States Patent
Rossin

(10) Patent No.: US 7,497,571 B2
(45) Date of Patent: Mar. 3, 2009

(54) FRAME FOR EYEGLASSES

(75) Inventor: Paolo Rossin, Legnano (IT)

(73) Assignee: Optigen Optical Group, S.r.l., Casorezzo-Milano (IT)

( * ) Notice: Subject to any disclaimer, the term of this patent is extended or adjusted under 35 U.S.C. 154(b) by 0 days.

(21) Appl. No.: 10/543,085

(22) PCT Filed: Oct. 29, 2003

(86) PCT No.: PCT/EP03/12029
§ 371 (c)(1),
(2), (4) Date: Jan. 3, 2007

(87) PCT Pub. No.: WO2004/066019
PCT Pub. Date: Aug. 5, 2004

(65) Prior Publication Data
US 2007/0146626 A1    Jun. 28, 2007

(30) Foreign Application Priority Data
Jan. 24, 2003    (IT)    ........................ MI2003A0105

(51) Int. Cl.
G02C 5/22    (2006.01)

(52) U.S. Cl. ........................................ 351/153; 16/228
(58) Field of Classification Search ................. 351/153, 351/111, 116, 41; 16/228
See application file for complete search history.

(56) References Cited

U.S. PATENT DOCUMENTS

| 3,264,678 A | 8/1966 | Parmelee |
| 3,422,449 A | 1/1969 | Rinnman |
| 6,217,170 B1 | 4/2001 | Hsiao |

FOREIGN PATENT DOCUMENTS

CA    2321318    4/2002

*Primary Examiner*—Hung X Dang
(74) *Attorney, Agent, or Firm*—James V. Costigan; Hedman & Costigan, P.C.

(57) ABSTRACT

A frame for eyeglasses comprising a lens supporting structure (12) and two temples (13) each connected laterally to said lens supporting structure (12) by means of a hinge device (14). According to the invention, said hinge device (14) comprises a first magnetic element (15) applied integral with said lens supporting structure (12) and a second magnetic element (16) applied integral with said temples (13), said first and said second magnetic element (15, 16) being engaged with each other to allow relative movement between said temples (13) and said lens supporting structure (12).

2 Claims, 4 Drawing Sheets

FRAME FOR EYEGLASSES

The present invention relates to a frame for eyeglasses.

Frames for eyeglasses are generally constituted by a lens supporting structure or front part, provided with nose pads and by two temples hinged to it, designed to produce the support behind the ears.

The hinge between the temples and the front part is generally produced with two jointed elements connected by means of a screw, pin or the like.

The aforesaid hinges are fragile elements which through time are particularly subject to wear and/or breakage. In fact, the screws often come loose and risk being lost.

Moreover, even if an additional joint and/or spring mechanism is provided, in respect of the joint connecting the temples to the front part, which allows the temples to move towards the outside, the portions of the frame bearing the lenses or above all the temples are often subject to deformation, which as well as being anti-aesthetic may impair the actual functionality of the frame.

In the event of irreparable damage to part of the frame, the entire frame must generally be replaced or taken to a specialized technician to request replacement of the element.

The general object of the present invention is to solve the aforesaid drawbacks of prior art in an extremely simple, inexpensive and particularly functional way.

Another object is to produce a frame for eyeglasses the components of which can be replaced in a simple and quick way even by non-specialized personnel.

In view of the aforesaid objects, according to the present invention a frame for eyeglasses is produced with the characteristics set forth in the accompanying claims.

The structural and functional characteristics of the present invention and its advantages in relation to prior art shall become more apparent and evident by examining the description hereunder, with reference to the accompanying drawings, which show a frame for eyeglasses produced according to the innovative principles of the invention.

Figure 1:
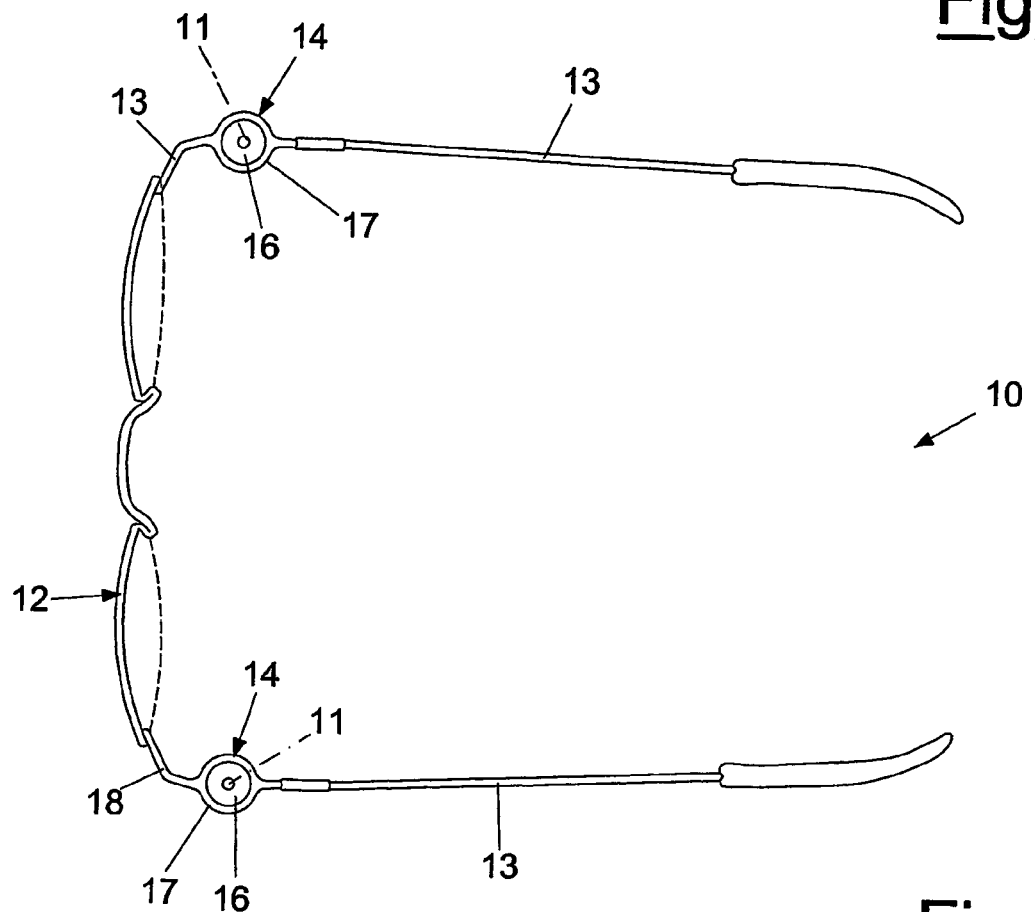
FIG. 1 shows a plan view of a first embodiment of a frame for eyeglasses according to the present invention.
Figure 2:
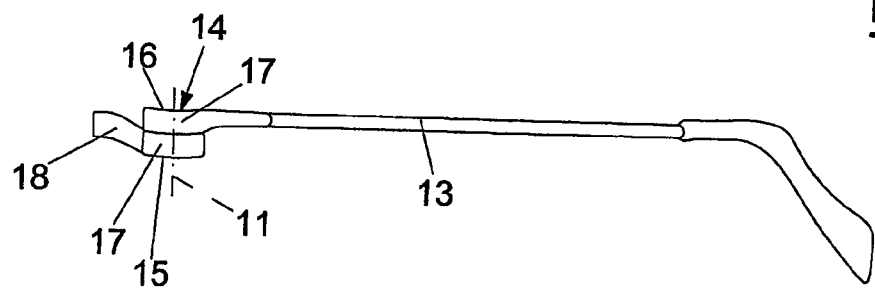
FIGS. 2 and 3 are side elevations of a hinge device of the frame in FIG. 1, shown mounted and exploded respectively.

With reference to the drawings, a frame for eyeglasses in question in the example shown, according to the present invention, comprises a lens supporting structure 12, or front part, and two temples 13 connected laterally to the lens supporting structure 12 each by means of a hinge device 14.

The hinge device 14 comprises a first magnetic lement 15 applied integral with the portion of frame 12 or 18 and a second magnetic element 16 applied integral with each of the temples 13.

The first and the second magnetic element 15 and 16 are engaged with each other in such a way as to allow a relative rotatory movement around an axis 11 between each of the temples 13 and the lens supporting portion 12.

FIGS. from 1 to 4 show a first embodiment of a frame for eyeglasses 10, in which the first and the second magnetic element 15 and 16 are constituted by disk-shaped elements placed engaging in an overlapping position.

In particular, the first and the second magnetic element 15 and 16 are each held along the entire perimeter by a ring structure 17 integral respectively with one end of the temple 13 and with a lateral extension 18 of the lens supporting structure 12.

Figure 3:
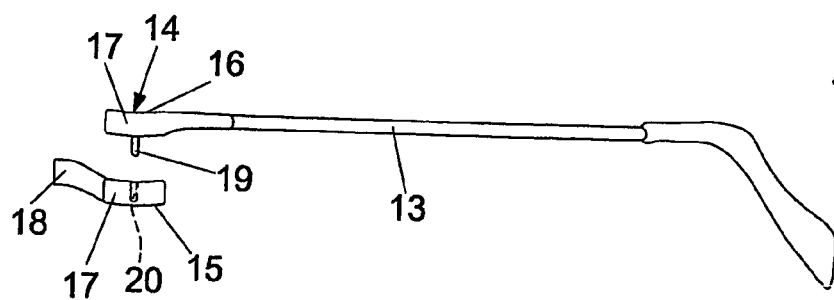

As shown in detail in FIG. 3, which represents the hinge device in a disassembled position, the magnetic elements 16 and 15 are respectively provided with a pin 19 and with a seat complementary to the pin 20, which define the axis of rotation 11 of the hinge device 14. The pin 19 may indiscriminately be applied to the magnetic element 16 or may be produced in one piece with it.

Figure 4:
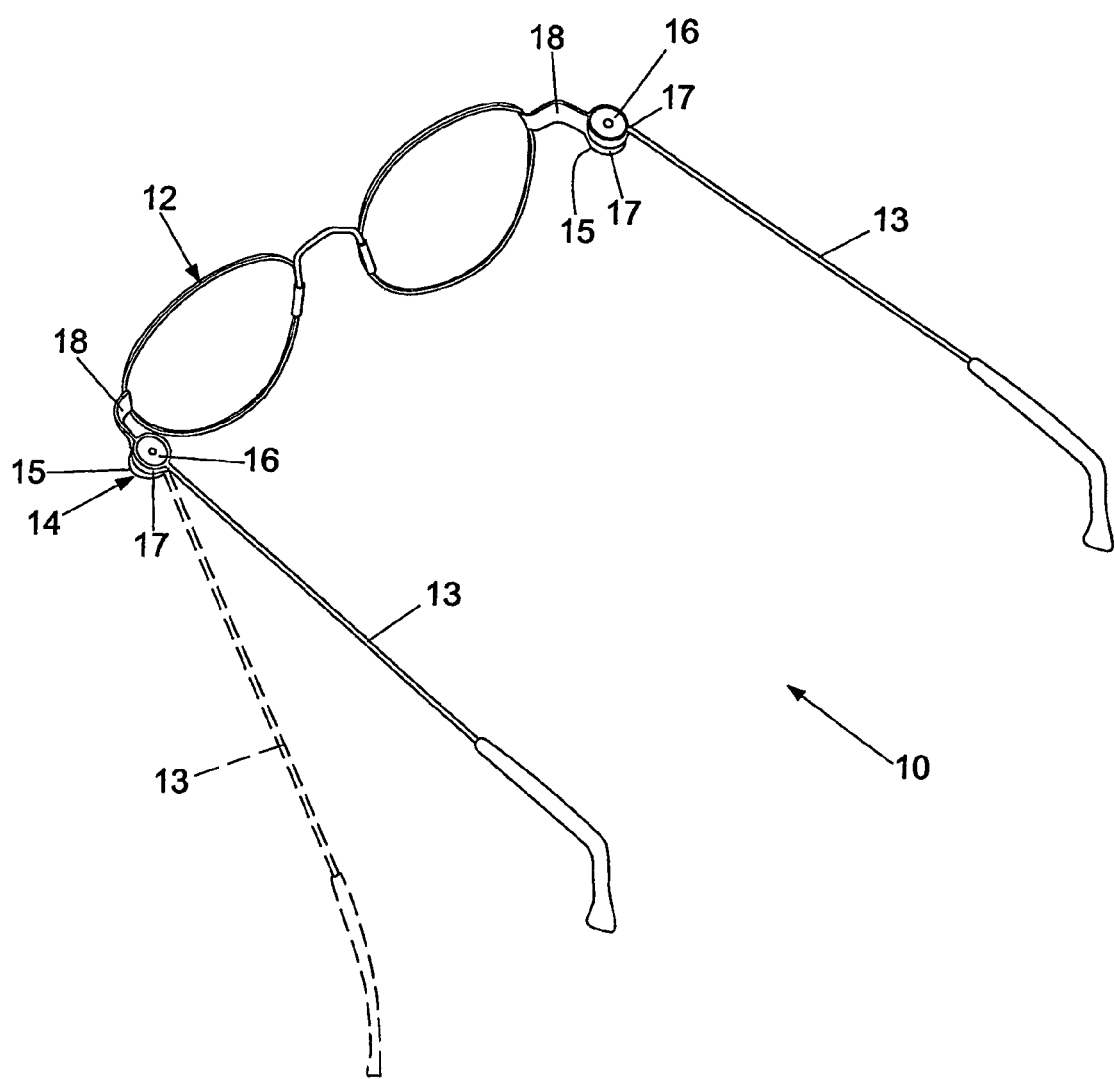
FIG. 4 is a perspective view of the frame in FIG. 1, in which a possible movement of the temples is schematically shown.
Figure 5:
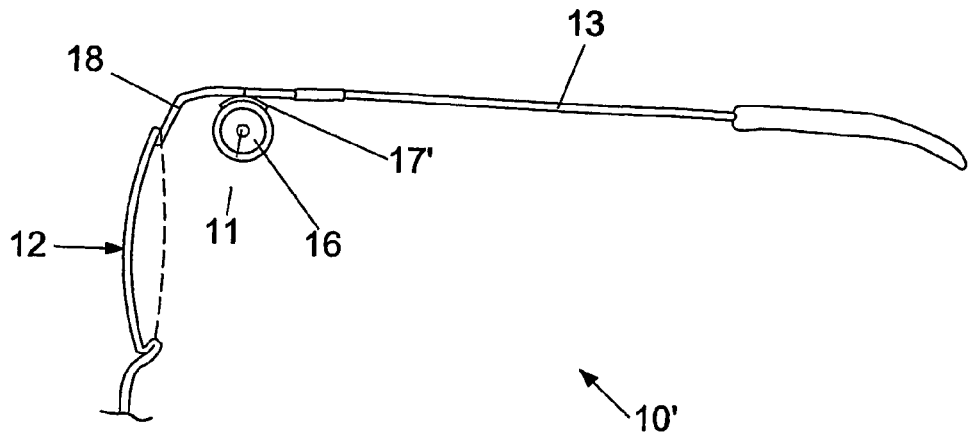
FIG. 5 is a partly cut-away plan view of a second embodiment of a frame for eyeglasses according to the present invention.
Figure 6:
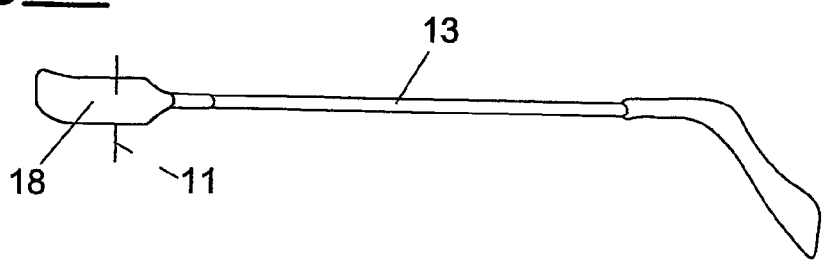
FIGS. 6 and 7 are raised side views of opposite sides of a hinge device of the frame in FIG. 5.
Figure 7:
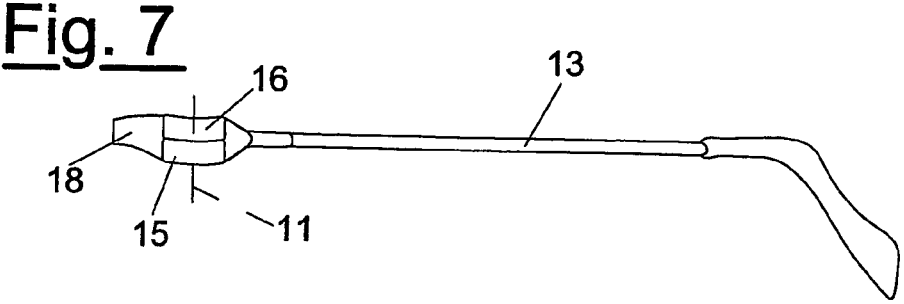
Figure 8:
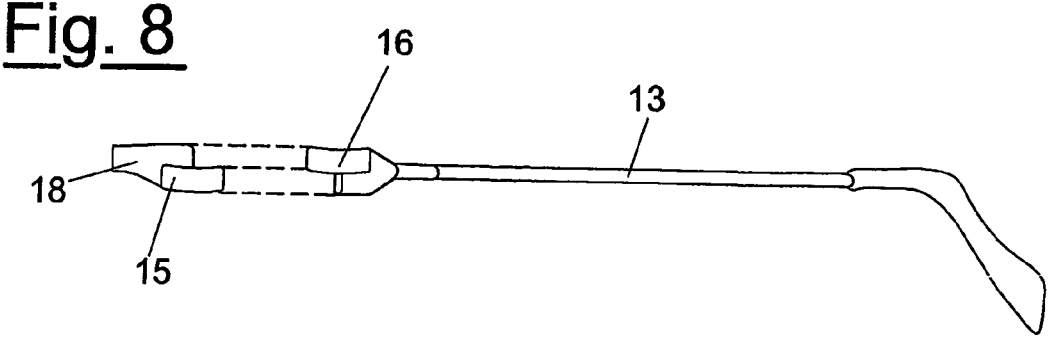
FIG. 8 is an exploded view of FIG. 7.

FIG. 4 also shows how the temples 13, connected to the lens supporting structure 12 by means of the hinge device 14, may advantageously also rotate outwards to reduce the risk of deformation.

FIGS. from 5 to 8 show a second embodiment of a frame for eyeglasses 10' in which the first and the second magnetic element 15 and 16 are constituted by disk-shaped elements placed engagingly in an overlapping position. The magnetic elements 15 and 16 are held on a perimetric portion of the structure 17', for example a segment of a circle, integral respectively with one end of the temple 13 or with a lateral extension 18 of the lens supporting structure 12.

Figure 9:
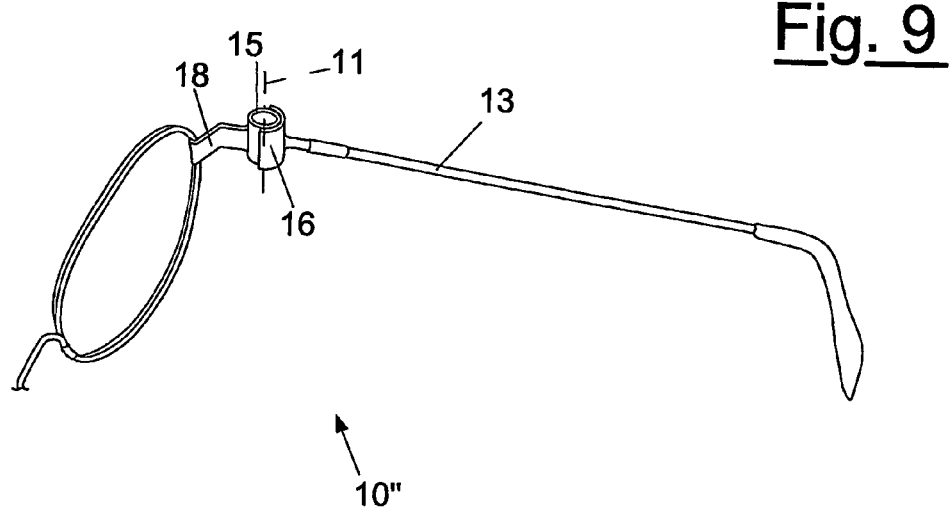
FIG. 9 is a partly cut-away perspective view of a third embodiment of a frame for eyeglasses according to the present invention.
Figure 10:
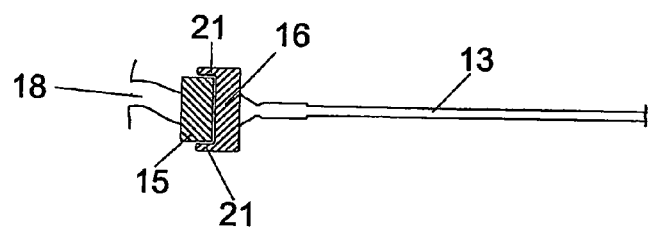
FIG. 10 shows a partly cross-sectional detail of a hinge device.

FIGS. 9 and 10 show a further embodiment of a frame for eyeglasses 10", in which the first magnetic element 15 is a cylinder integral with the lateral extension 18 of the lens supporting structure 12 and the second magnetic element 16 is a casing portion with dimensions complementary to the cylinder 15 and integral with one end of the temples 13. The casing 16 may rotate in contact with the cylinder 15 around the axis 11, coinciding with the axis of the cylinder.

The cross-sectional detail in FIG. 10 shows a variant of the hinge device in FIG. 9 in which the casing 16 is provided with flat retaining walls 21, which stabilize the position on the cylinder 15, so that when the temple is stressed to open outwardly, the magnetic pull (between the two opposite magnets) causes a sort of friction during opening and when the temple is released there is a pull that returns said temple to its original position (to replace spring systems used until now in the sector, commonly called "flex" mechanisms).

Figure 11:
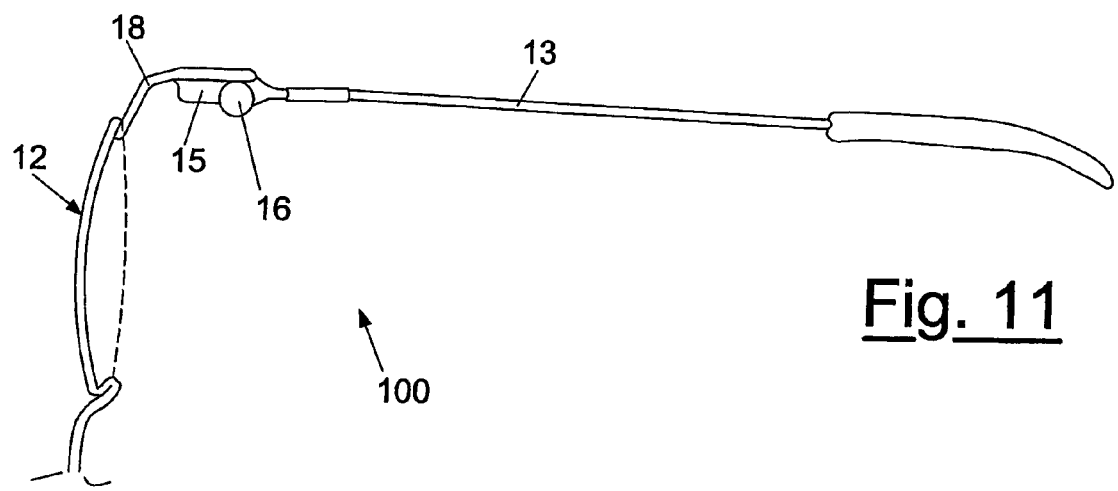
FIG. 11 is a partly cut-away plan view of a further embodiment of a frame for eyeglasses according to the present invention.

FIG. 11 represents a further embodiment of a frame for eyeglasses 100, in which the magnetic elements 15 and 16 are made to engage side by side. In the example shown, the magnetic element 16 integral with the temple 13 is provided with a circular perimeter portion, which engages in a complementary seat produced on the perimeter of the magnetic element 15, which is integral with the lens supporting structure 12.

A further object of the present invention is the lens supporting structure alone, designed to be positioned to engage with the temples, or each of these temples.

In fact, the frame for eyeglasses, according to the present invention, advantageously allows easy replacement of the temples not only in the case of damage, but also for example to vary the colour.

From the description hereinbefore with reference to the figures, it is apparent that a frame for eyeglasses according to the invention is particularly useful and advantageous. The object mentioned in the preamble to the description is thus attained.

Naturally, the forms of the frame for eyeglasses of the invention may vary from the one shown purely as a non-limiting example in the drawings, just as the materials may be different.

The scope of protection of the invention is therefore defined by the accompanying claims.

The invention claimed is:

1. Frame for eyeglasses comprising a lens supporting structure (12) and two temples (13) each connected laterally to said lens supporting structure (12) by means of a hinge device (14), characterized in that said hinge device (14) comprises a first magnetic element (15) applied integral with said lens supporting structure (12) and a second magnetic element (16) applied integral with said temples (13), said first and said second magnetic element (15, 16) being engaged with each other to allow relative movement between said temples (13) and said lens supporting structure (12) said frame further characterized in that said first and said second magnetic element (15, 16) are positioned engaging overlapping and additionally characterized in that said first and said second magnetic element (15, 16) positioned overlapping, are respectively equipped with a pin (19) and a complementary seat (20) designed to define as axis of rotation (11) of said hinge device (14).

2. Frame for eyeglasses as claimed in claim 1, characterized in tat said first and said second magnetic element (15, 16) are each held at least on a perimetric portion by a structure (17, 17') integral with a lateral extension (18) of the lens supporting structure (12).

* * * * *